United States Patent Office 3,442,660
Patented May 6, 1969

3,442,660
INACTIVATION OF ENZYMES IN MEAT
Joseph L. Shank, Matteson, Ill., assignor to Swift & Company, Chicago, Ill., a corporation of Illinois
No Drawing. Filed Sept. 28, 1965, Ser. No. 491,010
Int. Cl. A23l *3/34*
U.S. Cl. 99—107                                    9 Claims

ABSTRACT OF THE DISCLOSURE

Meat tissue previously treated with a proteolytic enzyme is processed to inactivate the enzyme within the meat by exposing the tissue to an atmosphere of carbon dioxide or oxygen at elevated pressures and for substantial periods of time.

---

The present invention relates to the inactivation of enzymes, and more particularly to the inactivation of enzymes in enzyme treated meat tissues.

Enzyme tenderization of meat has long been practiced in the meat processing industry. Various methods for bringing the enzyme into intimate contact with the meat tissues have been employed with varying degrees of success. Such methods include spraying, dipping and pumping of enzyme solution onto or into the meat being treated.

A more recent technique is that of ante-mortem injection which was first disclosed and claimed in U.S. Patent No. 2,903,362 issued to Beuk et al. on Sept. 8, 1959. Briefly, this technique involves injection of an amount of a plant-derived proteolytic enzyme solution into the vascular system of a living animal, holding the animal for a period of time and subsequently slaughtering. While this method has met with a great degree of commercial success, one shortcoming of the process arises from the fact that treatment conditions sufficient to yield the desired degree of muscle tenderization frequently results in an adverse effect upon other tissues, particularly the glandular tissues such as livers, kidneys and tongues, inasmuch as the enzyme tends to become concentrated in these organs, sometimes causing a mushy texture upon cooking. Consequently, these organs may have limited consumer acceptance.

Although to a somewhat lesser degree, overtenderization also occurs in meats which have been treated with proteolytic enzymes by methods other than ante-mortem injection, for example, post-mortem pumping techniques.

An economical method for eliminating the effects of this overtenderization would be greatly desired by the producer and would result in increased consumer acceptance of these products.

It is therefore an object of the present invention to provide a method for improving the marketability of enzyme treated meat.

It is an additional object of this invention to provide a method for inactivating enzymes present in meats containing extraneous enzymes.

It is yet a further object to provide a method for canning enzyme treated meats which will result in a product which is free from mushiness on cooking.

A further object is to provide a process for inactivating the enzymes present in enzyme treated meat, and thus permit the use of less drastic sterilization treatments than heretofore required.

Additional objects if not specifically set forth herein will be readily apparent to those skilled in the art from the following detailed description of the invention.

In general, the desired results of the present invention are accomplished by the in situ treatment of enzyme containing animal tissues with a gaseous atmosphere of carbon dioxide or oxygen under super-atmospheric conditions. Although the prior art has taught that treatment of certain food materials with carbon dioxide under pressure is effective in inhibiting bacterial growth, it is surprising that a treatment of this nature would be effective in the inactivation of enzymes. The unexpected result is due to the fact that bacteria inhibition with carbon dioxide under pressure has been felt to be due to the formation of carbonic acid which lowers the pH of the food material being treated and thus inhibits the bacteria. Conversely, as will be shown in the later examples, proteolytic enzymes are not inactivated by the lower pH, but are inactivated under the conditions of the present process wherein the meat is exposed to gas pressure for a time sufficient to render the enzyme inactive.

In the practice of the present invention, meat treated with enzymes, such as the plant derived proteolytic enzymes papain, bromelin, ficin and cathepsin, is either ground or cut into cubes or slices having a thickness of from about ⅛ to about 2 inches, with a thickness of from ⅜ to 1 inch being preferred. The meat is then placed into a pressure chamber into which is admitted an amount of treating gas sufficient to bring the atmospheric pressure to from about 75 to about 1200 p.s.i. Meat held in this gaseous atmosphere for a period of from about 0.5 hour to about 72 hours is substantially free from enzyme activity.

In the preferred operation of the present invention, the pressure of the treating gas is ordinarily from about 200 p.s.i. to about 1200 p.s.i., with a holding time of from about 2 hours to about 8 hours. It will be understood, of course, that a lower pressure will require a relatively longer holding time while a higher pressure requires a shorter holding period to obtain a similar result.

As a preferred embodiment of the present invention, it has been found that a substantial reduction in time can be obtained, as well as an elimination of any bacteria which may exist in the meats being treated, if the present pressurizing process is employed concurrently with a canning process for the meats being treated. In such operation, the meat is placed in a pressurized chamber and subjected to a gas as in the above description. However, the meat is canned while in the pressurized compartment. Thus, the meat treated by this embodiment may be continuously subjected to the gaseous pressure until ultimate use by the consumer. This extended treatment, in addition to inactivating the enzyme, also destroys any vegetable bacteria as well as bacterial spores which may be present in the meat, thereby serving a dual purpose. In addition, this embodiment substantially reduces production cost since the extended holding period within the pressurized chamber is not required.

An additional advantage of the present invention resides in the fact that there is a substantial reduction in the severity of subsequent sterilization treatments which are often employed in regard to meat. For example, when the present process is combined with irradiation treatments heretofore employed in sterilizing meat, it is found that a radiation dosage of from about 500,000 to about 1 million rads yields a degree of sterilization that is comparable with previous treatments using about 4.5 million rads.

The following examples are presented for the purpose of illustration only and are not to be construed as limiting the scope of the invention.

EXAMPLE I

Ante-mortem enzyme injected meat pieces having a thickness of 1 inch were contacted with and enveloped in an atmosphere of $CO_2$ at a pressure of 120 p.s.i. and held for 6 hours. The results of this treatment were compared with results obtained with a treatment comprising lowering the pH of similar meat pieces to 4.8, the pH of meat pieces treated with $CO_2$ at 120 p.s.i., with lactic acid and using an inert gas, i.e. nitrogen, to produce a pressure of 120 p.s.i. The following results were obtained where reduction of enzyme activity is measured as an organoleptic function of meat tenderness.

TABLE 1

| Pressure | Lactic acid | Carbon dioxide | Nitrogen |
|---|---|---|---|
| Atmospheric | Mushy | Soft | |
| 120 p.s.i. | do | Firm | Mushy |

The above results show that reduction in enzyme activity is not attributable merely to pH and/or pressure.

EXAMPLE II

The following experiments were conducted to determine the effect of various pressures and holding times upon ante-mortem enzyme injected meat treated with carbon dioxide. Shear pressure in pounds per square inch was used as the criteria for determining firmness of the treated meat.

TABLE 2

| Sample No. | Time (min.) | Pressure (p.s.i.) | lb./in.² to shear |
|---|---|---|---|
| 1 | 120 | 120 | 38 |
| 2 | 120 | 200 | 44 |
| 3 | 120 | 300 | 51 |
| 4 | 90 | 75 | 34 |
| 5 | 30 | 75 | 30 |
| Control | | | 21 |

EXAMPLE III

The following experiments were conducted to determine the effect of various pressures and holding times upon ante-mortem enzyme injected meat treated with oxygen:

TABLE 3

| Sample No. | Time (min.) | Pressure (p.s.i.) | Lb./in. to shear |
|---|---|---|---|
| 1 | 60 | 1,100 | 54 |
| 2 | 30 | 1,100 | 41 |
| 3 | 60 | 800 | 38 |
| 4 | 10 | 800 | 24 |
| 5 | 10 | 300 | 27 |
| Control | | | 17 |

EXAMPLE IV

A sample of ante-mortem treated liver was divided into six pieces. Three of the pieces were inoculated with spores of clostridium 3679. The samples were then subjected to pressures of 120 p.s.i. using carbon dioxide, oxygen or nitrogen, the nitrogen treated pieces being controls. Upon reaching a constant pressure, the pieces were canned while in the pressure chamber. After eight days, the cans were opened and the following results were noted:

TABLE 4

| Type treatment | Total count | Shear pressure (lb./in.²) |
|---|---|---|
| Uninoculated, $N_2$ | 1,800,000 | 10 |
| Inoculated, $N_2$ | 400,000,000 | 8 |
| Uninoculated, $CO_2$ | 1 | 45 |
| Inoculated, $CO_2$ | 10 | 48 |
| Uninoculated, $O_2$ | 10,000 | 34 |
| Inoculated, $O_2$ | 120,000 | 31 |

Obviously, many modifications and variations of the invention as hereinbefore set forth may be made without departing from the spirit and scope thereof, and therefore only such limitations should be imposed as are indicated in the appended claims.

I claim:
1. A process for inactivating proteolytic enzymes in enzyme containing meat tissues comprising: subjecting said meat tissues to an atmosphere of carbon dioxide under a pressure of at least 75 p.s.i. for from about 0.5 hour to about 72 hours to inactivate enzymes present in said tissues and releasing the pressure therefrom.

2. A process for inactivating enzymes in enzyme treated meat tissues comprising: subjecting enzyme treated meat tissues to an atmosphere of carbon dioxide at a pressure of from about 75 to about 1200 p.s.i. for from about 2 hours to about 8 hours, and releasing the pressure therefrom.

3. The process of claim 2 wherein the enzyme treated tissues are selected from the group consisting of livers, kidneys and tongues.

4. The process of claim 2, wherein the enzyme treated meat tissues are ante-mortem injected tissues.

5. The process of claim 2, wherein the enzyme treated meat tissues are treated with a plant-derived proteolytic enzyme selected from the group consisting of papain, bromelin, ficin and cathepsin.

6. A process for inactivating proteolytic enzymes in enzyme treated meat tisues comprising: subjecting said tissues to an atmosphere of oxygen under a pressure of at least 75 p.s.i. for from about 0.5 hour to about 72 hours to inactivate enzymes present in said tissues and releasing the pressure therefrom.

7. A process for inactivating enzymes in enzyme treated meat tissues comprising: subjecting said tissues to an atmosphere of a gas selected from the group consisting of carbon dioxide and oxygen under a pressure of at least 75 p.s.i. for a time of from about 0.5 hour to about 72 hours, and canning said tissues while under said pressure.

8. The process of claim 7, wherein said pressure is from about 200 p.s.i. to about 1200 p.s.i.

9. The process of claim 7, wherein the enzyme treated meat tissues are ante-mortem injected tissues.

References Cited

UNITED STATES PATENTS

| | | |
|---|---|---|
| 2,454,716 | 11/1948 | Ramsbottom et al. 99—109 X |
| 3,033,691 | 5/1962 | Smythe et al. |
| 3,052,551 | 9/1962 | Hogan 99—107 |
| 3,216,826 | 11/1965 | Wattenbarger 99—107 |

OTHER REFERENCES

Laidler: "Introduction to the Chemistry of Enzymes," 1954, published by McGraw-Hill Book Companying, Inc., New York, pp. 130–135, inclusive.

HYMAN LORD, *Primary Examiner.*

U.S. Cl. X.R.

99—187